US009776283B2

(12) United States Patent
Erlwein

(10) Patent No.: US 9,776,283 B2
(45) Date of Patent: Oct. 3, 2017

(54) METHOD FOR CUTTING A SHEET METAL BLANK HAVING A PREDETERMINED CONTOUR

(71) Applicant: SCHULER AUTOMATION GMBH & CO. KG, Hessdorf (DE)

(72) Inventor: Heinz Erlwein, Kunreuth (DE)

(73) Assignee: SCHULER AUTOMATION GMBH & CO. KG, Hessdorf (DE)

( * ) Notice: Subject to any disclaimer, the term of this patent is extended or adjusted under 35 U.S.C. 154(b) by 161 days.

(21) Appl. No.: 14/764,724

(22) PCT Filed: Feb. 18, 2014

(86) PCT No.: PCT/EP2014/053141
§ 371 (c)(1),
(2) Date: Jul. 30, 2015

(87) PCT Pub. No.: WO2014/131659
PCT Pub. Date: Sep. 4, 2014

(65) Prior Publication Data
US 2015/0360324 A1 Dec. 17, 2015

(30) Foreign Application Priority Data
Feb. 28, 2013 (DE) .................. 10 2013 203 385

(51) Int. Cl.
*B23K 26/38* (2014.01)
*B23K 26/40* (2014.01)
(Continued)

(52) U.S. Cl.
CPC ............ *B23K 26/38* (2013.01); *B23K 26/032* (2013.01); *B23K 26/0846* (2013.01); *B23K 26/0876* (2013.01)

(58) Field of Classification Search
CPC   B23K 26/38; B23K 26/4005; B23K 26/0876; B23K 26/032; B23K 26/038
(Continued)

(56) References Cited

U.S. PATENT DOCUMENTS 4,551,912 A * 11/1985 Marks ............... H01L 21/67144
228/170
5,910,260 A *  6/1999 Gerber ................. B23K 26/082
219/121.67

(Continued)

FOREIGN PATENT DOCUMENTS

DE         10231032 A1    1/2004
EP          2420344 A1    2/2012

OTHER PUBLICATIONS

PCT, "International Search Report for International Application No. PCT/EP2014/053141".

(Continued)

*Primary Examiner* — Samuel M Heinrich
(74) *Attorney, Agent, or Firm* — Manabu Kanesaka

(57) ABSTRACT

The invention relates to a method for cutting a sheet metal blank having a predetermined contour from a metal strip that is continuously conveyed in a transport direction (x). The method includes the following steps of providing at least one laser cutting apparatus having at least one laser cutting head that can be moved both in the transport direction and in a y-direction extending perpendicularly thereto, and a control device for controlling a movement of the laser cutting head in accordance with a control program generating the predetermined contour; continuously measuring a path ($\Delta X_{strip}$) of the metal strip in relation to the transport direction by means of a path measurement device provided upstream of the laser cutting apparatus; and dynamically calculating the movements of the at least one laser cutting head by means (Continued)

Figure 1:
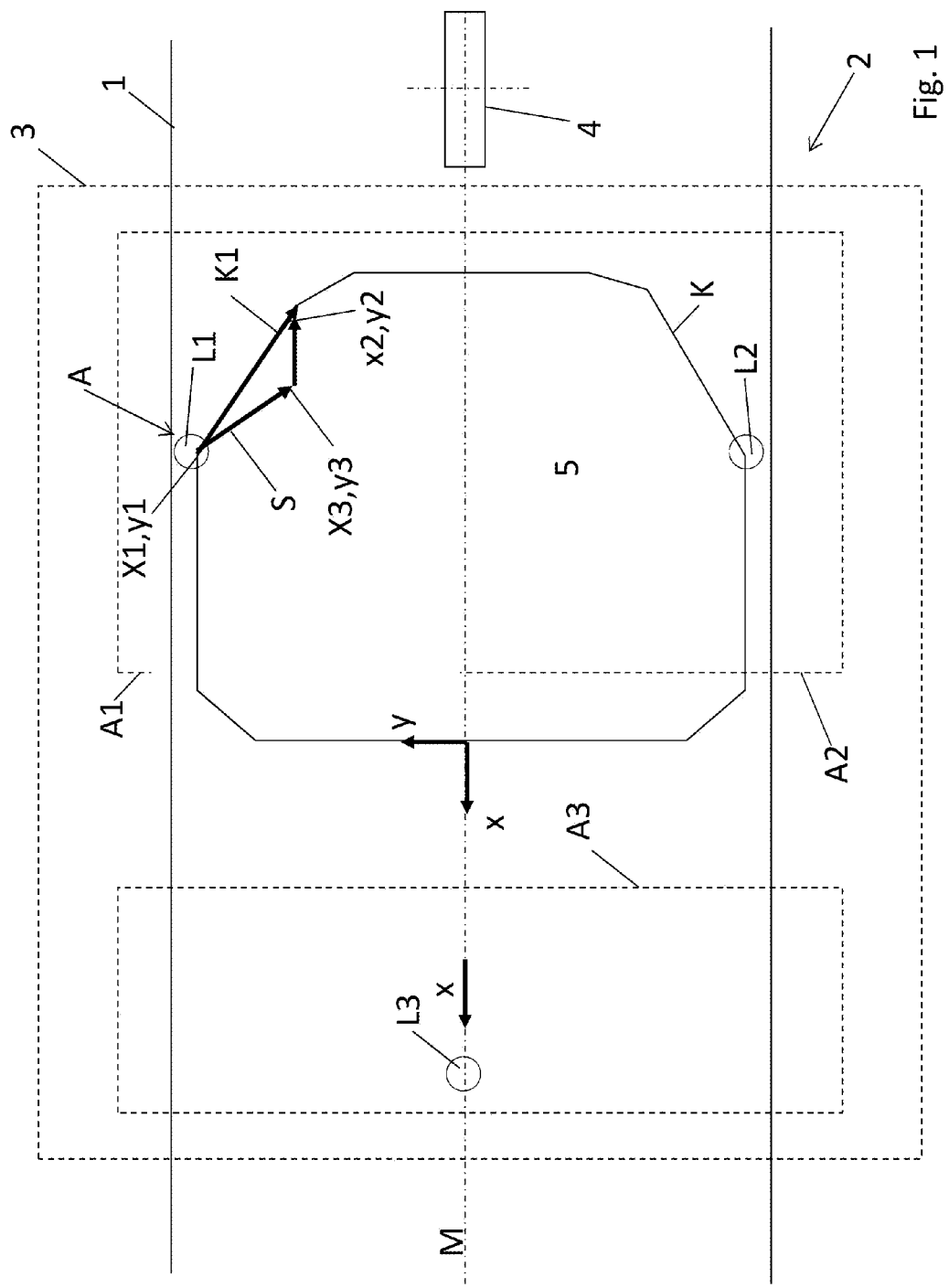

of the control program with use of the measured path values provided by the path measuring device.

10 Claims, 5 Drawing Sheets

(51) Int. Cl.
*B23K 26/08* (2014.01)
*B23K 26/03* (2006.01)

(58) Field of Classification Search
USPC ............ 219/121.67–121.72, 121.62, 121.83, 219/121.76
See application file for complete search history.

(56) References Cited

U.S. PATENT DOCUMENTS

| | | | |
|---|---|---|---|
| 6,763,284 B2* | 7/2004 | Watanabe | B25J 9/1697 219/121.67 |
| 8,253,064 B2 | 8/2012 | Beck et al. | |
| 2002/0053271 A1 | 5/2002 | Koenders | |
| 2003/0118229 A1* | 6/2003 | Andrews | B23Q 15/013 382/141 |
| 2008/0190903 A1 | 8/2008 | Klotzbach et al. | |
| 2010/0181165 A1 | 7/2010 | Finn | |

OTHER PUBLICATIONS

PCT/IPEA/409, "International Preliminary Report on Patentability for International Application No. PCT/EP2014/053141."

* cited by examiner

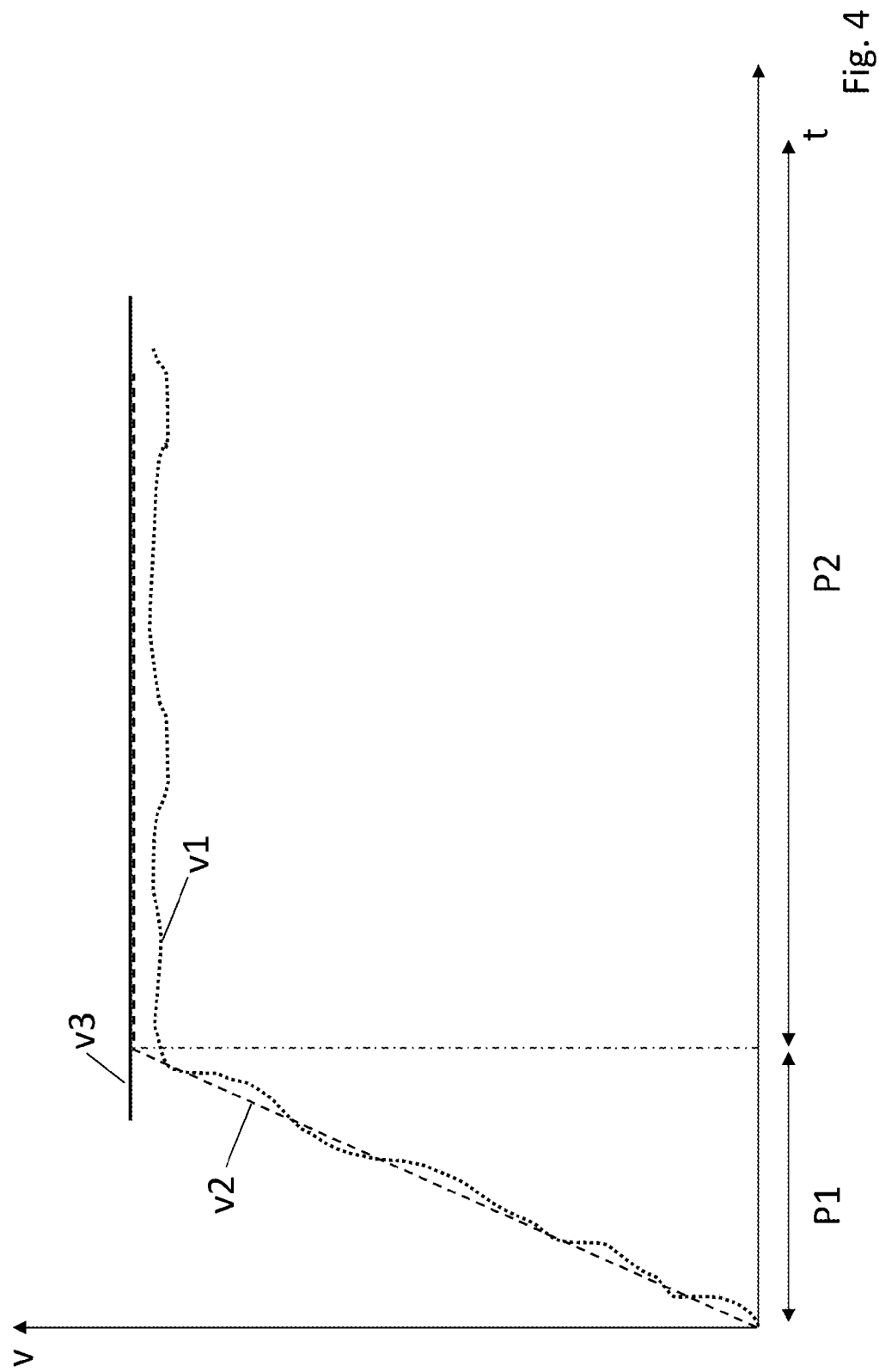

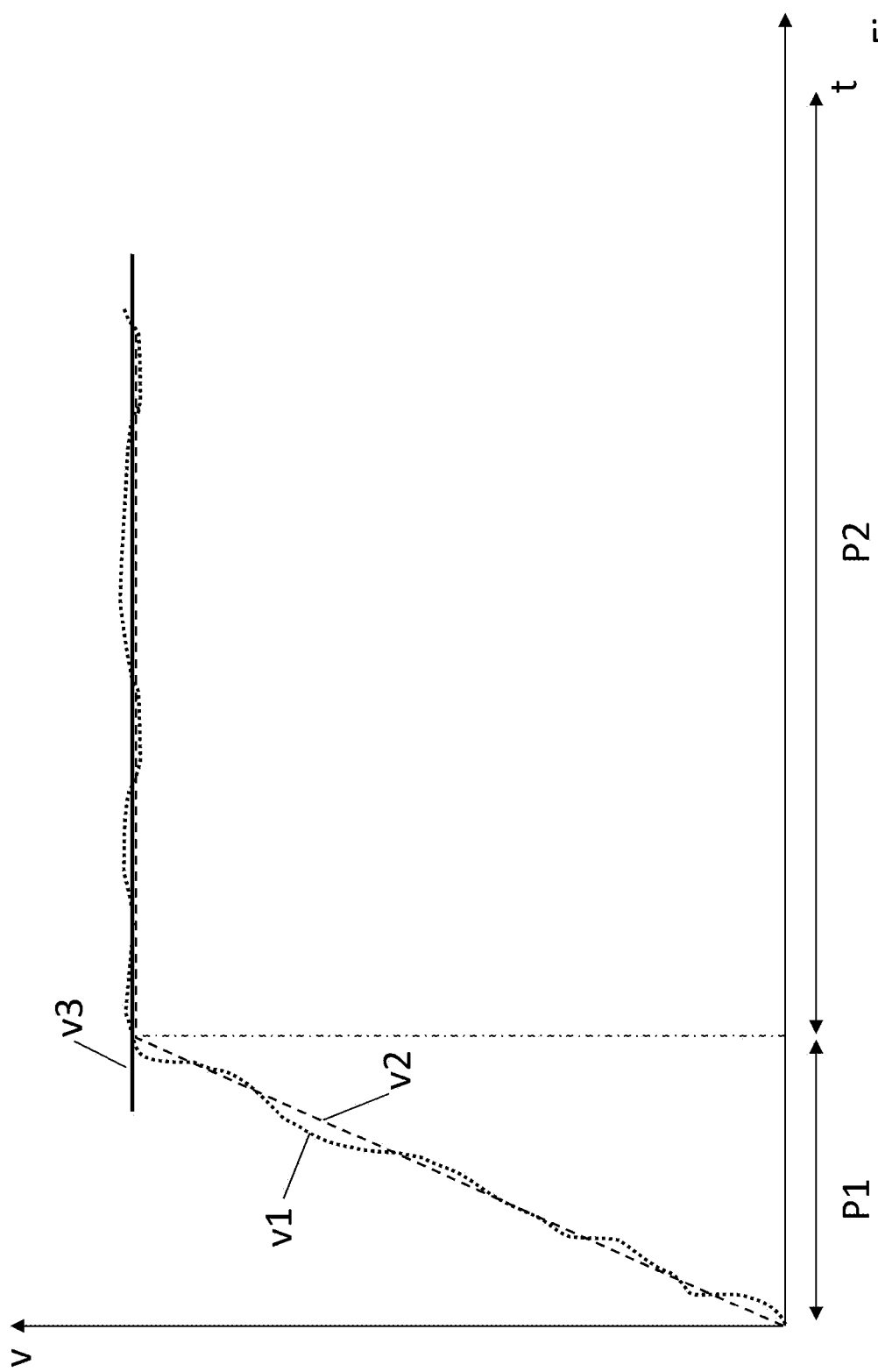

METHOD FOR CUTTING A SHEET METAL BLANK HAVING A PREDETERMINED CONTOUR

RELATED APPLICATIONS

The present application is National Phase of International Application No. PCT/EP2014/053141 filed Feb. 18, 2014, and claims priority from German Application No. 10 2013 203 385.0, filed Feb. 28, 2013, the disclosure of which is hereby incorporated by reference herein in its entirety.

The invention relates to a method for cutting a sheet metal blank having a predetermined contour from a metal strip that is continuously conveyed in a transport direction.

A method of this type is known for example from WO 2009/105608 A1. In the known method a laser cutting apparatus with a plurality of laser cutting heads is provided, which can each be moved by means of a control device in a transport direction and in a y-direction extending perpendicularly thereto, such that sheet metal blanks of a predetermined contour can be cut from the metal strip. In the known method the metal strip is guided on a conveyor belt in a transport direction. It is additionally guided by a first pressure roller pair at the start of the conveyor belt and a second pressure roller pair at the end of the conveyor belt. The movement of the pressure roller pairs is such that the metal strip is held on the conveyor belt in a tensioned manner. In order to generate the tension, it is necessary for the second pressure roller pair provided at the end of the conveyor belt to be driven at a higher speed than the conveyor belt or the first pressure roller pair provided at the start of the conveyor belt. With the known method there may be undesirable speed fluctuations during the transport of the metal strip in the transport direction. Such speed fluctuations may be caused in particular by variations in the strip thickness or by the surface condition of the metal strip and associated unpredictable breaks of a frictional connection between the pressure rollers and/or the conveyor belt. Consequently, there may be undesirable deviations in the production of the contoured cut. The sheet metal blanks produced by the known method do not always have the predetermined contour. Defective sheet metal blanks must be reworked or discarded.

The object of the invention is to overcome the disadvantages of the prior art. In particular, a method that is as simple and economical as possible is to be specified, with which sheet metal blanks of a predetermined contour can be produced with improved accuracy from a metal strip that is continuously conveyed in a transport direction.

This object is achieved by the features of claim 1. Expedient embodiments of the invention will emerge from the features of claims 2 to 9.

In accordance with the invention a method for cutting a sheet metal blank having a predetermined contour from a metal strip that is continuously conveyed in a transport direction is proposed, said method comprising the following steps:

providing at least one laser cutting apparatus having at least one laser cutting head that can be moved both in the transport direction and in a y-direction extending perpendicularly thereto, and a control device having a control program for calculating a cutting path corresponding to the predetermined contour and for controlling a movement of the laser cutting head along the cutting path, continuously measuring a path of the metal strip, covered in the transport direction, by means of a path measurement device provided upstream of the laser cutting apparatus, and continuously calculating the cutting path of the laser cutting head by means of the control program with use of the measured path values measured by the path measurement device, and moving the laser cutting head along the cutting path, such that the sheet metal blank is cut in accordance with the predetermined contour.

The method proposed in accordance with the invention is surprisingly simple and enables the production of sheet metal blanks of a predetermined contour with improved accuracy. In contrast to the prior art, with an apparatus for carrying out the method according to the invention the pressure roller pairs at the start and in the end region of the conveyor belt can be omitted. The proposed method is additionally insensitive in view of quality fluctuations occurring within the metal strip, in particular variations in the surface condition and/or thickness of the sheet metal strip.

The measured path values are advantageously path sections $\Delta x$ covered by the metal strip within a predetermined cycle $\Delta t$. The measured path values are measured at a cycle rate corresponding to the predetermined cycle $\Delta t$ and are transmitted to the control program for processing. The cycle rate is at least 100 Hz, preferably at least 500 Hz, particularly preferably at least 1 kHz.

Within the sense of the present invention the cutting path is "calculated continuously". In other words position coordinates defining the cutting path are calculated continuously in accordance with a predetermined cycle rate. The calculation is performed during the movement of the laser cutting head. Any speed fluctuations during the transport of the metal strip can thus be compensated for particularly quickly and reliably. The laser cutting head moves along the cutting path in an accelerated or delayed manner or at constant speed. It may also be that the laser cutting head at times is not moved.

Since, in accordance with the invention, the path covered by the metal strip is continuously measured directly at the metal strip and the movements of the at least one laser cutting head are continuously calculated on the basis of the measured path values, speed fluctuations can be identified immediately and inaccuracies caused thereby in the production of the contour cut can be securely and reliably avoided.

In accordance with an advantageous embodiment the continuous calculation of the cutting path is performed in real time. For this purpose the control program runs on a process computer having a real-time operating system.

The metal strip is moved continuously in the transport direction by means of a transport device. The transport device may be, for example, a roller levelling machine, with which the metal strip unwound from a coil is fed to the laser cutting apparatus. A transport speed generated with the roller levelling machine can be regulated by means of a regulation device. It may correspond to the predetermined target speed. Instead of the aforementioned roller levelling machine, the metal strip may of course also be conveyed in the transport direction by means of other transport devices, for example transport rollers, a conveyor belt or the like.

In accordance with a particularly advantageous embodiment of the invention, in order to calculate the cutting path, starting values are calculated on the basis of a target speed of the transport device and the starting values are then corrected with use of the measured path values. Processing time can thus be saved and the method according to the invention can be made even quicker. If no measured path values are available due to a disruption, the movements of the laser cutting head can also be performed on the basis of the starting values available to the control program. In this case the contour indeed has a reduced accuracy. Nevertheless, a further production of the sheet metal blanks and/or a regulated shutdown of the apparatus is/are possible in this case.

In accordance with a further advantageous embodiment of the invention the path measurement device comprises at least one path recorder. The path measurement device may also comprise a plurality of path recorders, wherein a first path of the metal strip upstream of the laser cutting device is measured with a first path recorder and a second path of the metal strip downstream of the laser cutting device is measured with a second path recorder. The measurement of the first and of the second path enables a more accurate and quicker continuous measurement, in particular with a laser cutting deice having a plurality of laser cutting heads provided in succession in the transport direction.

The path measurement device may comprise a plurality of path recorders provided upstream of the laser cutting device, wherein the first path is measured on an upper side of the metal strip by means of the first path recorder and a third path is measured on a lower side of the metal strip by means of a third path recorder. In other words the path of the metal strip can be measured simultaneously substantially at the same point both on the upper side thereof and on the lower side thereof. By forming an average value between the first and the third path, the path of the metal strip can be determined particularly exactly. The proposed method is additionally redundant. In the event of the failure of the first or third path recorder, measured path values can still be provided for the continuous calculation of the cutting path of the at least one laser cutting head.

In accordance with a further embodiment of the invention the path measurement device comprises a fourth path recorder, with which a fourth path of the metal strip within the laser cutting device is measured between two laser cutting heads arranged successively in the transport direction. A fourth path of the metal strip within the laser cutting device is measured using the fourth path recorder. This enables a particularly accurate continuous calculation of cutting paths of, for example, laser cutting heads provided downstream of the fourth path recorder.

The path measurement device may comprise at least one optical and/or mechanical path recorder. The mechanical path recorder may be expediently a measuring wheel resting on the upper side and/or lower side of the metal strip.

It is of course also possible, on the basis of the measured path values determined using the path measurement device, to continuously determine an actual speed of the metal strip. The actual speed values can also be used to calculate and/or correct the cutting path.

In accordance with a further advantageous embodiment the measured path values are used to regulate a speed of a transport device for transporting the metal strip in the transport direction. A transport device usually has a regulator, with which a transport speed of the metal strip is regulated. For this purpose a speed of revolution of rollers of the transport device is measured and compared with a target value. Due to a slip between the metal strip and the transport rollers, however, it may be that an actual speed of the metal strip is less than the target transport speed generated with the transport device. Since, in accordance with an advantageous embodiment the measured path values are used to regulate the speed of the transport device, the transport speed of the metal strip can be held in the region of the target transport speed with high accuracy.

Figure 2:
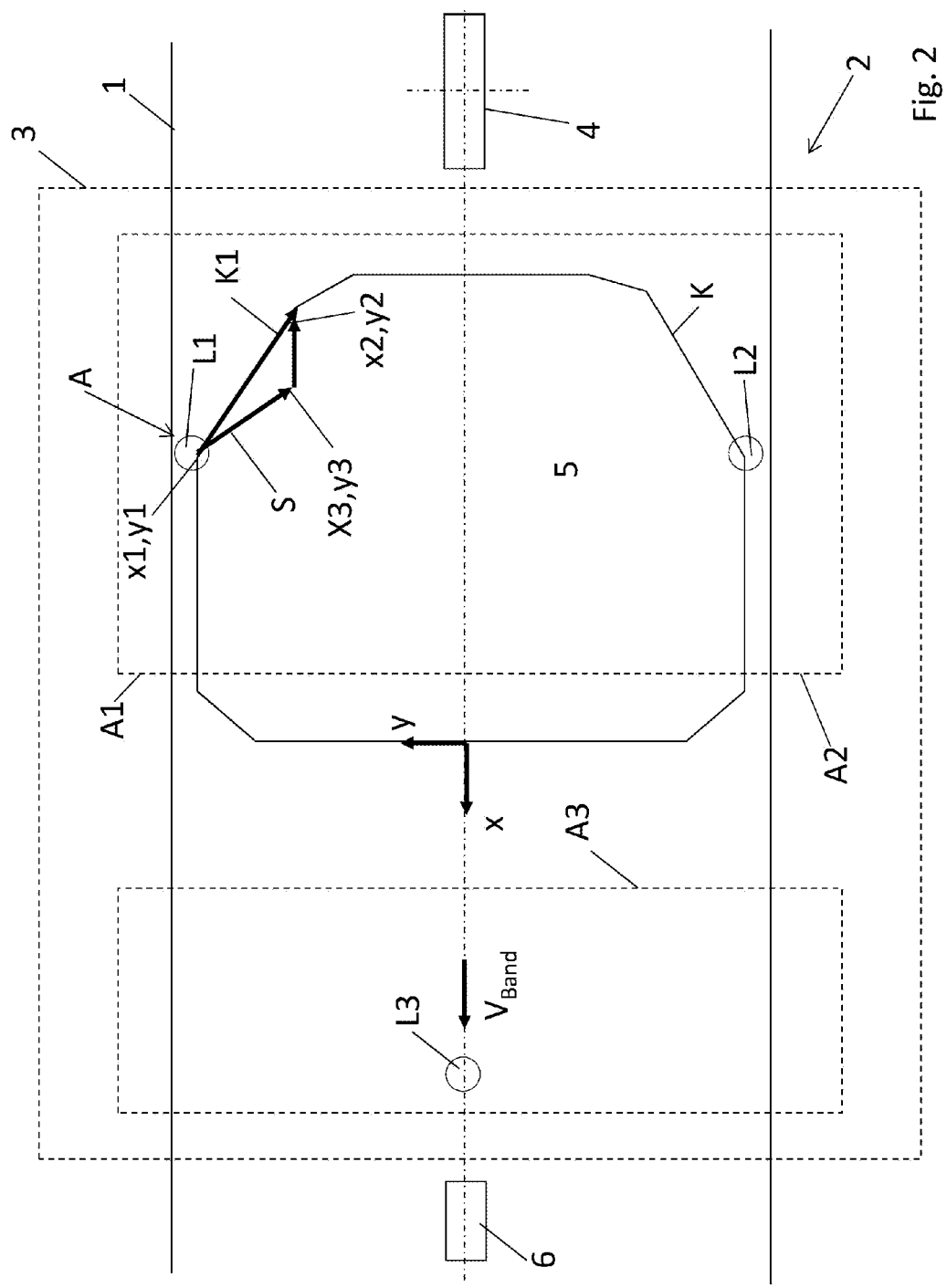
Figure 3:
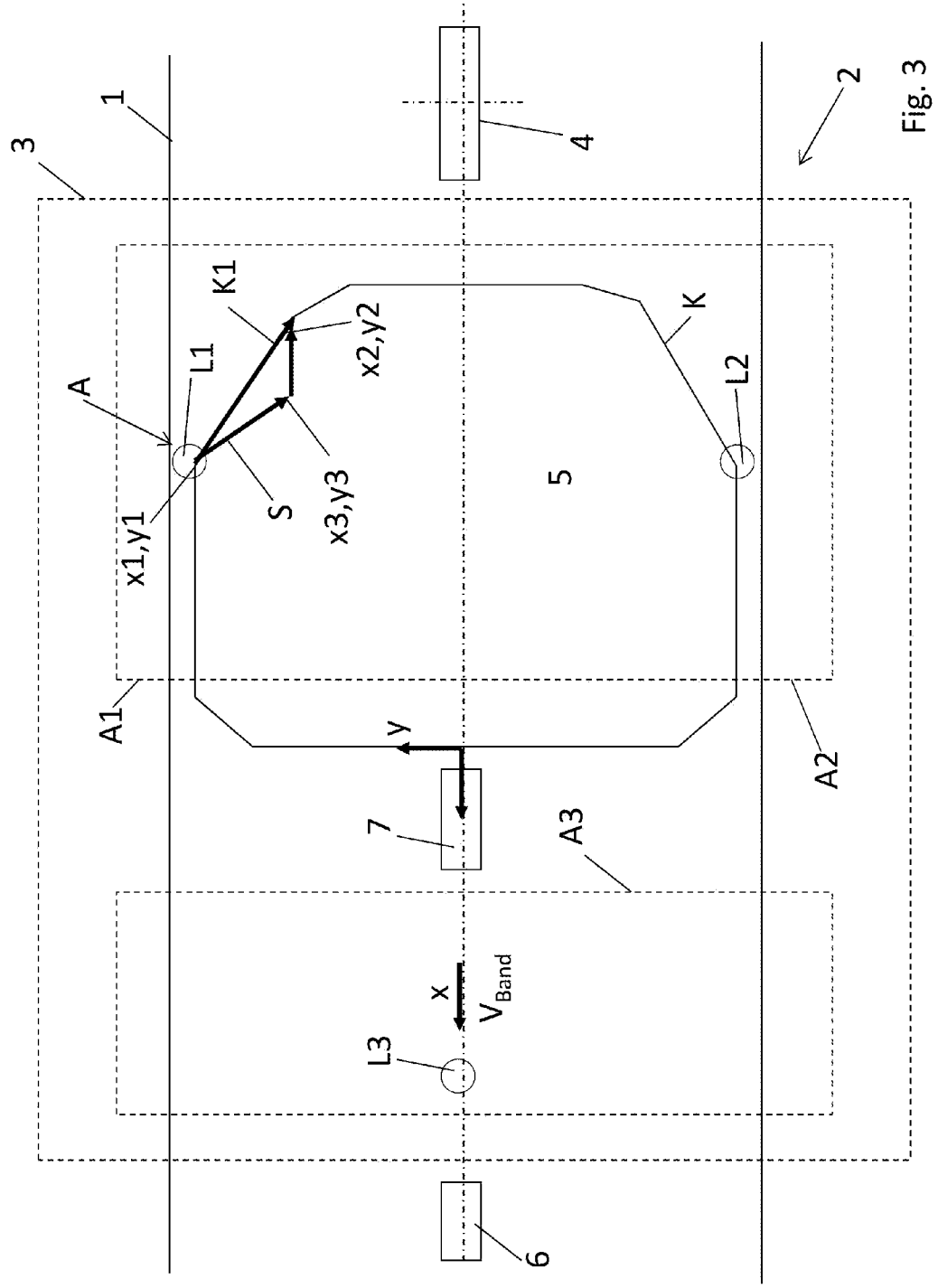

Exemplary embodiments of the invention will be explained in greater detail hereinafter with reference to the drawings, in which:

FIG. 1 shows a schematic plan view of a first apparatus for carrying out the method, FIG. 2 shows a schematic plan view of a second apparatus for carrying out the method, FIG. 3 shows a schematic plan view of a third apparatus for carrying out the method, and FIG. 4 shows the speed of the metal strip over time with a first method variant, and FIG. 5 shows the speed of the metal strip over time with a second method variant.

FIGS. 1 to 3 schematically show apparatuses for carrying out the method according to the invention. A metal strip designated by reference sign 1 is unwound for example from a coil (not shown here) and is transported by means of a transport device (not shown here) in a transport direction or x-direction. In so doing, the metal strip 1 is guided through a laser cutting apparatus 2, which is delimited by a cabin 3 which is impermeable to light. The laser cutting apparatus 2 comprises a plurality of laser cutting heads L1, L2 and L3. A first L1 and a second laser cutting head L2 have a first A1 and a second working range A2. A centreline M runs through the laser cutting apparatus 2. The first A1 and the second working range A2 have approximately the same extension in the x-direction. They lie side by side in the x-direction. A third laser cutting head L3 is located downstream of the first A1 and the second working range A2 and has a third working range A3. The third working range A3 may have an extension in the y-direction which corresponds approximately to the extension of the first A1 and the second working range A2 considered together. The laser cutting heads L1, L2 and L3 are each mounted on slides (not shown here) displaceable in the x-direction, which span the respective working range A1, A2, A3. The heads are movable on the respective slides in the y-direction. Each of the laser cutting heads L1, L2 and L3 is movable separately by means of a control device (not shown here) in accordance with a predetermined control program.

Reference sign 4 designates a first path recorder, which is arranged upstream of the laser cutting apparatus 2 in the region of the centreline M. This may be a mechanical path recorder, with which a measuring wheel rests on an upper side of a belt in a frictionally engaged manner. The path covered by the metal strip 1 can be determined from the angle of rotation and the diameter of the measuring wheel.

Reference sign 5 designates a sheet metal blank, which is to be cut in a predetermined contour K from the metal strip 1 by means of the laser cutting apparatus 2.

The contour K is advantageously generated by producing a plurality of contour sub-cuts engaging with one another. Each of the contour sub-cuts is produced here with one of the laser cutting heads L1, L2 or L3. The cutting paths S of the laser cutting heads L1, L2 and L3 necessary for generating the contour sub-cuts are calculated by means of the control program.

In FIG. 1 reference sign K1 designates a contour portion. In order to produce the contour portion K1, first position coordinates x1, y1 and second position coordinates x2, y2 of the contour portion K1 are stored in the control program. The measured path values provided with the first path recorder 4 are transferred to the control program. The control program now continuously calculates, for example on the basis of vector addition, further position coordinates, which all together form the cutting path S. When calculating the further position coordinates the movement of the metal strip 1 in the transport direction x over a path ΔX during the respective cycle is taken into consideration in each case. The cutting path S ends at third position coordinates x3, y3. A difference between the values x2 and x3 corresponds to the path covered by the metal strip 1 in the transport direction x during the production of the cutting path S With the second apparatus shown in FIG. 2 a second path recorder 6 is provided downstream of the laser cutting apparatus 2. A second path of the metal strip 1 can thus be measured downstream of the laser cutting apparatus 2. This makes it possible for example to form a mean value from the first and the second path and therefore to determine in a more exact manner the actual path ΔX covered by the metal strip 1 during a cycle.

In the exemplary embodiment shown in FIG. 3 a further path recorder 7 is provided within the laser cutting apparatus 2 between the working ranges A1, A2 and A3 arranged in succession in the transport direction x. The further path recorder 7 is arranged directly before the third working range A3. A particularly exact measurement of the path ΔX of the metal strip 1 can thus be taken directly before the production of a contour sub-cut made using the third laser cutting head L3.

As is clear in particular from the above explanation, the exact knowledge of the path ΔX of the metal strip 1 covered per cycle is necessary for the exact production of the contour K. Even with a small deviation between a "target path" given from a target speed of a transport device, for example a roller levelling machine, and the path actually covered by the metal strip 1, the predetermined second position coordinates x2, y2 of the contour portion K1 cannot be observed. Consequently, the entire contour K of the sheet metal blank 5 is changed.

The paths covered by the metal strip 1 measured using the path recorders 4, 6, 7 are preferably processed in real time by the control program. In other words the cutting path S calculated using the control program can be changed during the cut.

FIG. 4 shows the actual speed of the metal strip 1 over time. The actual speed v1 of the metal strip 1 is reproduced by the dotted line. Further, the speed v2 of the transport device is shown in FIG. 4 by a dashed line. A solid line illustrates the desired target speed v3 of the metal strip 1.

In FIG. 4 a "start phase" is denoted by the reference sign P1, during which the metal strip 1 is accelerated. Reference sign P2 designates an "operating phase", during which the metal strip 1 is to be transported at the target speed v3.

As can be seen from FIG. 4, the actual speed v1 of the metal strip 1 fluctuates. It is additionally persistently lower during the operating phase P2 than the target speed v3. The difference between the target speed v3 and the actual speed v1 during the operating phase P2 is caused by a slip of the metal strip 1 in the transport device.

The deviation of the actual speed v1 of the metal strip 1 from the target speed v3 can be largely compensated for by means of the path measurement proposed in accordance with the invention.

FIG. 5, similarly to FIG. 4, shows the aforementioned speeds over time. In the method variant shown here the measured path values recorded in accordance with the invention are used as control variables in a control circuit for regulating the speed of the transport device. It is thus possible to largely compensate for a slip between the transport device and the metal strip 1. The actual speed v1 of the metal strip 1 can thus be held largely exactly in the region of the predetermined target speed v3 during the operating phase p2. In this case the deviations of the actual speed v1 of the metal strip 1 from the target speed v3 are much smaller. With the proposed method variants the respective cutting paths S have to be changed merely to a small extent. Consequently, there is an improved accuracy of the contour K. In addition, the method can also be performed at a higher transport speed of the metal strip 1.

LIST OF REFERENCE SIGNS 1 metal strip
2 laser cutting device
3 cabin
4 first path recorder
5 sheet metal blank
6 second path recorder
7 further path recorder
A starting position
A1 first working range
A2 second working range
A3 third working range
B cutting position
K contour
K1 contour section
L1 first laser cutting head
L2 second laser cutting head
L3 third laser cutting head
P1 start phase
P2 operating phase
S cutting path
v1 actual speed
v2 speed of the transport device
v3 target speed
x transport direction
x1,y1 first position coordinates
x2,y2 second position coordinates
x3,y3 third position coordinates
y direction perpendicular to the transport direction
ΔX path of the metal strip/cycle

The invention claimed is:
1. A method for cutting a sheet metal blank having a predetermined contour from a metal strip that is continuously conveyed in a transport direction by means of a transport device, said method comprising:
providing at least one laser cutting apparatus having at least one laser cutting head that moves in the transport direction and in a y-direction extending perpendicularly thereto, and a control device having a control program for calculating a cutting path corresponding to the predetermined contour and for controlling a movement of the laser cutting head along the cutting path,
continuously measuring a path of the metal strip in relation to the transport direction by means of a path measurement device provided upstream of the laser cutting apparatus,
regulating a speed of the transport device with use of measured path values provided by the path measurement device in order to hold an actual speed of the metal strip in a region of a predetermined target speed of the metal strip,
continuously calculating the cutting path of the laser cutting head by means of the control program with use of the measured path values, and
moving the laser cutting head along the cutting path, such that the sheet metal blank is cut in accordance with the predetermined contour.

2. The method according to claim 1, wherein in the step of continuously calculating the cutting path, the cutting path is calculated in real time.

3. The method according to claim 1, wherein, in order to calculate the cutting path, starting values are calculated on a basis of a target speed of the transport device, and wherein the starting values are then corrected with use of the measured path values.

4. The method according to claim 1, wherein the path measurement device comprises at least one path recorder.

5. The method according to claim 1, wherein the path measurement device comprises a plurality of path recorders, wherein a first path of the metal strip upstream of the laser cutting device is measured with a first path recorder, and a second path of the metal strip downstream of the laser cutting device is measured with a second path recorder.

6. The method according to claim 5, wherein the plurality of path recorders further includes a third path measuring on a lower side of the metal strip by means of a third path recorder.

7. The method according to claim 6, wherein the plurality of path recorders further includes a fourth path recorder, with which a fourth path of the metal strip within the laser cutting device is measured between two laser cutting heads arranged successively in the transport direction.

8. The method according to claim 1, wherein the path measurement device comprises at least one optical and/or mechanical path recorder.

9. The method according to claim 1, wherein the at least one laser cutting head includes a first cutting head arranged upstream of the laser cutting device, a second cutting head arranged apart from the first cutting head in the y-direction extending perpendicularly to the transport direction, and a third cutting head arranged downstream of the first and second laser cutting heads, and the first and second cutting heads have working ranges same to each other in the transport direction, and the third cutting head has a working range in the y-direction corresponding to the working ranges of the first and second heads in the y-direction.

10. The method according to claim 9, wherein in the step of continuously calculating the cutting path, the cutting path of each of the first, second, and third cutting heads is calculated, and in the step of moving the laser cutting head, each of the first, second, and third cutting heads moves along the cutting path calculated in the step of continuously calculating the cutting path to form the predetermined contour.

* * * * *